United States Patent [19]
Liu et al.

[11] Patent Number: 5,808,879
[45] Date of Patent: Sep. 15, 1998

[54] HALF-BRIDGE ZERO-VOLTAGE-SWITCHED PWM FLYBACK DC/DC CONVERTER

[75] Inventors: Rui Liu, Plano, Tex.; Wen-Jian Gu, Hartsdale, N.Y.

[73] Assignee: Philips Electronics North America Corporation, New York, N.Y.

[21] Appl. No.: 773,117

[22] Filed: Dec. 26, 1996

[51] Int. Cl.$^6$ .......................... H02M 3/335; H02M 3/24; G05F 1/013
[52] U.S. Cl. ................. 363/17; 363/20; 363/98; 363/21; 323/224; 323/222
[58] Field of Search ................. 363/17, 16, 20, 363/21, 132, 98, 124

[56] References Cited

U.S. PATENT DOCUMENTS

| | | | |
|---|---|---|---|
| 4,533,986 | 8/1985 | Jones | 363/17 |
| 5,066,900 | 11/1991 | Bassett | 323/224 |
| 5,126,931 | 6/1992 | Jitaru | 363/21 |
| 5,245,520 | 9/1993 | Imbertson | 363/17 |
| 5,471,376 | 11/1995 | Tsai et al. | 363/20 |

*Primary Examiner*—Peter S. Wong
*Assistant Examiner*—Rajnikant B. Patel
*Attorney, Agent, or Firm*—Edward Blocker

[57] ABSTRACT

A DC-DC ZVS PWM converter circuit which utilizes the leakage inductance of an output transformer and a three-step operation cycle so as to reduce the voltage stress on the converter power switching transistors and to reduce the EMI noise emissions of the circuit.

21 Claims, 8 Drawing Sheets

HALF-BRIDGE ZERO-VOLTAGE-SWITCHED PWM FLYBACK DC/DC CONVERTER

BACKGROUND OF THE INVENTION

This invention relates generally to DC/DC power converters and, more particularly, to a DC/DC-power converter circuit for converting a DC voltage input at one voltage level to a DC output voltage at a different voltage level, and to a method of operating such a circuit.

Switching power supplies for converting DC voltages from one voltage level to another are well known in the art. Forward or flyback converters with a boost clamp or a buck-boost clamp also are well known in the art. None of them are suitable for high voltage off-line power supplies because of the high voltage stress that occurs in the semiconductor power switches.

Figure 1A:
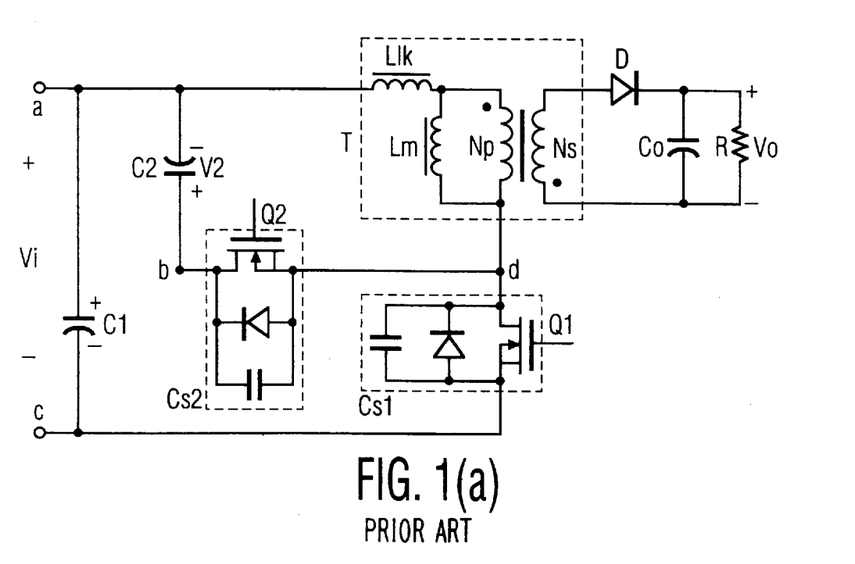
FIGS. 1(a) and 1(b) illustrate prior art clamp mode flyback DC/DC converters.
Figure 1B:
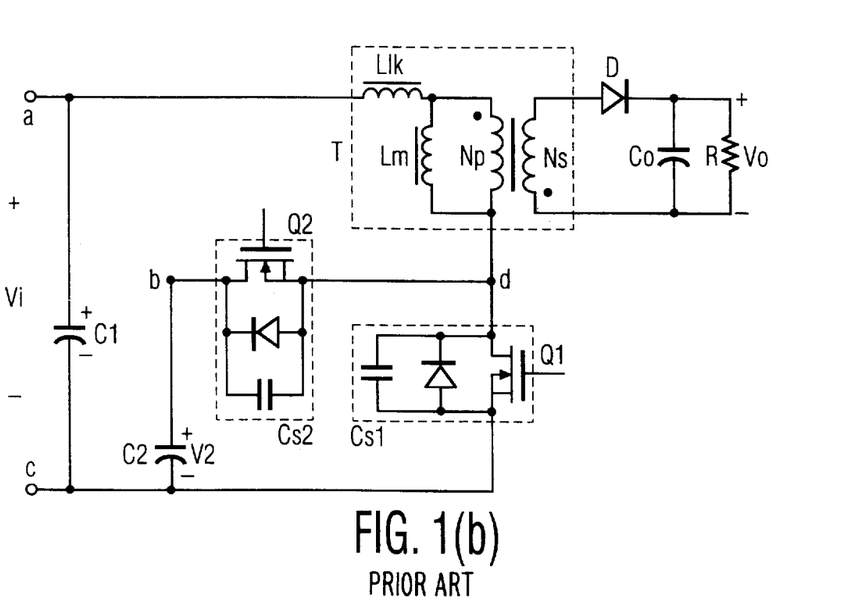

FIGS. 1a and 1b are circuits illustrating prior art type clamp mode flyback DC/DC converters, where Llk and Lm are leakage inductance and magnetizing inductance, respectively, of the transformer T as seen from the primary side of the transformer. Capacitors Cs1 and Cs2 are the junction capacitances of the MOSFET switches Q1 and Q2, respectively. In FIG. 1(a), the clamping capacitor C2 is connected to the positive terminal of the DC input voltage. Inductors Llk, Lm, MOSFET switches Q1, Q2 and capacitor C2 form an auxiliary buck-boost converter. The capacitor voltage V2 is expressed as:

$$V_2 = D(Vi)/(1-D) \qquad (1),$$

where D is the ON duty ratio of the MOSFET switch Q1.

In FIG. 1(b), the clamping capacitor C2 is connected to the negative terminal (c) of the DC input voltage. Inductors Llk, Lm, MOSFET switches Q1 and Q2 and capacitor C2 form an auxiliary boost converter. The capacitor voltage is expressed as:

$$V_2 = Vi/(1-D) \qquad (2).$$

Therefore, the voltage across terminals (b) and (c) in both cases is obtained as follows:

$$Vbc = Vi/(1-D) \qquad (3).$$

From the above it can be seen that the voltage stress of the two MOSFET switches Q1 and Q2 in the converters shown in FIG. 1 is:

$$Vst = Vi/(1-D) \qquad (4).$$

Generally, the ON duty ratio of a switch is designed to be approximately 0.5. In that case the voltage stress of the semiconductor switch from equation (4) will be twice that of the input voltage, Vi. In high line voltage applications, high voltage MOSFET switches are then required, resulting in high cost for the MOSFET switches and a limited selection thereof.

A known converter similar to that shown in FIG. 1a herein is the clamp mode flyback DC/DC converter described in U.S. Pat. No. 5,066,900. The circuit in FIG. 5 of this patent is similar to the prior art circuit in FIG. 1a herein except that the secondary side of the transformer is a forward output instead of a flyback output, and the position of the high-side circuit is exchanged with the position of the low-side circuit. This DC/DC converter employs one or more semiconductor switches. A problem that occurs with such circuits is that the voltage that the semiconductor switch has to withstand is approximately twice that of the DC input voltage. This is termed herein the "voltage stress" of the switch. There are applications for such converters that involve high line voltages, for example, the voltages that are typical outside of the U.S.A., such as the 220 volts which is a typical line voltage in Europe with a peak voltage of 310 V. Using the circuit described in this patent would require semiconductor switches that can withstand voltages of 440 volts or higher, which results in excessively costly switches, especially of the high voltage MOSFET, which usually are preferred. This prior art converter is not suitable for a high voltage off-line power supply because of the high voltage stress in the semiconductor power switches.

A converter is shown in FIG. 1 of U.S. Pat. No. 5,126,931 which is almost identical to the prior art circuit in FIG. 1b herein, except that the secondary side of the transformer is a forward output instead of a flyback output. This converter includes a boost clamp but suffers from the same drawbacks as the circuit of U.S. Pat. No. 5,066,900. U.S. Pat. No. 4,959,764 and EP 0 508 664 A1 describe other examples of the same types of converters, which can be characterized as belonging to one of the following types: forward or flyback converter with a boost clamp or a buck-boost clamp. None of them is suitable for high voltage off-line power supplies because of the high voltage stress in the power switches.

The circuit shown in FIG. 3 of U.S. Pat. No. 5,057,986 is a converter circuit which subjects its power switches to a lower voltage stress compared with the circuits of the above-identified patents. However as is conventional in prior art converters, the leakage inductance is made as small as possible so that energy can be transferred effectively to the secondary side of the transformer, which produces a step change in the primary winding current of the voltage transformer. This step change usually results in excessive electromagnetic interference (EMI) noise emission, making it difficult to use such a converter as a power supply in, for example, a television receiver or a VCR. The converter of this patent has only two operation stages (see FIGS. 5 and 6) and a voltage conversion ratio Vout/Vin which is linear function of the duty ratio D (see equation (3) of the patent).

SUMMARY OF THE INVENTION

It is an object of the invention to provide a DC/DC converter circuit having semiconductor switches in which the voltage stress on the semiconductor switches is reduced.

Another object of the invention is to provide a DC/DC converter circuit exhibiting reduced radiated and conducted EMI noise emission.

Still another object of the invention is to provide a DC/DC converter circuit of the pulse width modulator (PWM) type exhibiting zero-voltage-switching (ZVS) to reduce switching losses, especially at high operating frequencies, and thus improve the circuit efficiency, and in which the incorporated semiconductor switches undergo voltage stresses that do not exceed the line voltage and which is suitable for high voltage off-line low noise power supply applications.

A further object of the invention is to provide a DC/DC converter circuit having a predetermined linkage inductance for the output transformer which is chosen so as to smooth the primary side current and thereby achieve low EMI noise emission.

A still further object of the invention is to provide a DC/DC converter circuit having a novel mode of operation including three distinct operation modes for each operating cycle.

Another object of the invention is to provide a converter having a voltage conversion ratio (Vout/Vin) which is a non-linear function of the duty ratio (D) and which depends upon circuit parameters such as operating frequency, leakage inductance and magnetizing inductance.

One aspect of the invention is based on the recognition that, to avoid excessive radiated EMI emissions, the circuit is configured to provide smooth primary-side current in the converter transformer. Another aspect of the present invention is based on the recognition that smooth primary side current in the converter transformer can be achieved together with reduced voltage stress on the power semiconductor switches with a converter circuit providing three operation stages during each switching cycle. Still another aspect of the present invention is based on the recognition that, contrary to the previous understandings of the operation of such converter circuits, a certain amount of leakage inductance is desirable in order to smooth the primary-side transformer current and thereby lessen the EMI.

In accordance with a preferred embodiment of the invention, a dc-dc converter circuit comprises a transformer having a primary, a secondary, and a magnetizing inductance connected in parallel with the primary. An auxiliary inductance is connected in series with the transformer primary. The circuit input has first and second terminals for connection to a dc input voltage source. A first switch connects the second input terminal to the transformer primary, and a second switch connects the first input terminal to the transformer primary. A first capacitor is connected in series with the first switch and the transformer primary, and a second capacitor is connected in series with the second switch and the transformer primary. A rectifier is connected to the transformer secondary, and the circuit output is connected to the rectifier and the transformer secondary. A controller is provided for controlling the operation of the switches such that:

i) during a first operation period, the first switch is open and the second switch is closed causing the currents through both the magnetizing inductance and auxiliary inductance to decrease, turning on the rectifier, ii) during a second operation period, the first switch is closed and the second switch is open causing the currents through the magnetizing inductance to continue to decrease while causing the current through the auxiliary inductance to increase, while the rectifier remains on, and iii) during a third operation period, while the first switch is closed and the second switch is open, when the current through the auxiliary inductance substantially equals the current through the magnetizing inductance, the current through both the auxiliary inductance and magnetizing inductance increase, turning off the rectifier.

Preferably, to achieve zero-voltage switching, at the initial part of the first and second operation periods, both the first and second switches are open for a short time period (dead-time).

In accordance with another preferred embodiment of the invention, a dc-dc converter circuit comprises a transformer having a primary, a secondary, and a magnetizing inductance connected in parallel with the primary. An auxiliary inductance is connected in series with the transformer primary. The circuit input has first and second terminals for connection to a dc input voltage source. A first switch connects the input second terminal to the transformer primary, and a second switch connects the input first terminal to the transformer primary. A first capacitor is connected in series with the first switch and the transformer primary, and a second capacitor is connected in series with the second switch and the transformer primary. A rectifier is connected to the transformer secondary, and the circuit output is connected to the rectifier and the transformer secondary. A controller is provided for controlling operation of the switches such that:

i) during an initial part of a first operation period, both the first and second switches are open for a short dead-time to achieve zero-voltage switching, ii) during the remainder of the first operation period, the first switch is open and the second switch is closed turning on the rectifier and causing the current through the rectifier to rise linearly, iii) during an initial part of a second operation period, both the first and second switches are open for a short dead-time to achieve zero-voltage switching.

iv) during the remainder of the second operation period, the first switch is closed and the second switch is open causing the current through the rectifier to fall linearly, v) during a third operation period, while the first switch is closed and the second switch is open, the rectifier is turned off, whereby the linear rise and fall of rectifier current reduces EMI noise generation and the voltage stress of the switches is reduced.

The operation of the converter circuits of the invention are somewhat similar to that of the known half-bridge, ZVS, PWM, clamp mode, flyback dc-dc converter in its basic operation. The major differences between converters of the invention and those of the prior art are that, in the converter of the invention, a smooth primary-side current is achieved instead of a current with a step change. Such a current can reduce both conducted and radiated EMI noise emission. Further, the converter of the invention is characterized by three operation stages instead of two stages. And the voltage conversion ratio Vout/Vin of the converter of the invention is a non-linear function of ON duty ratio D of the first switch. As a result, the converter of the invention is suitable for high-voltage, off-line (such as Europe line), low noise power supply applications.

The invention also includes the method of operating the various embodiments of the circuits as described below.

In accordance with the invention, the leakage inductance, if intrinsic, can be adjusted, for example, increased, by winding the primary winding and the secondary winding side by side. If additional inductance is desired, an extrinsic inductor can be added in series. Similarly, the magnetizing inductance can be controlled by the transformer geometry and reduced, if desired, by adding an inductor in parallel.

The various features of novelty which characterize the invention are pointed out with greater particularly in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, similar reference numerals designating the same or similar elements.

DESCRIPTION OF THE PREFERRED EMBODIMENTS

The prior art DC/DC converter circuits shown in FIGS. 1(a) and 1(b) have been described above. When these converters are operated with a customary duty ratio of approximately 0.5, the voltage stress on the semiconductor switches Q1 and Q2 is approximately twice the value of the DC supply voltage (Vi) at the circuit input terminals (a) and (c).

Figure 2A:
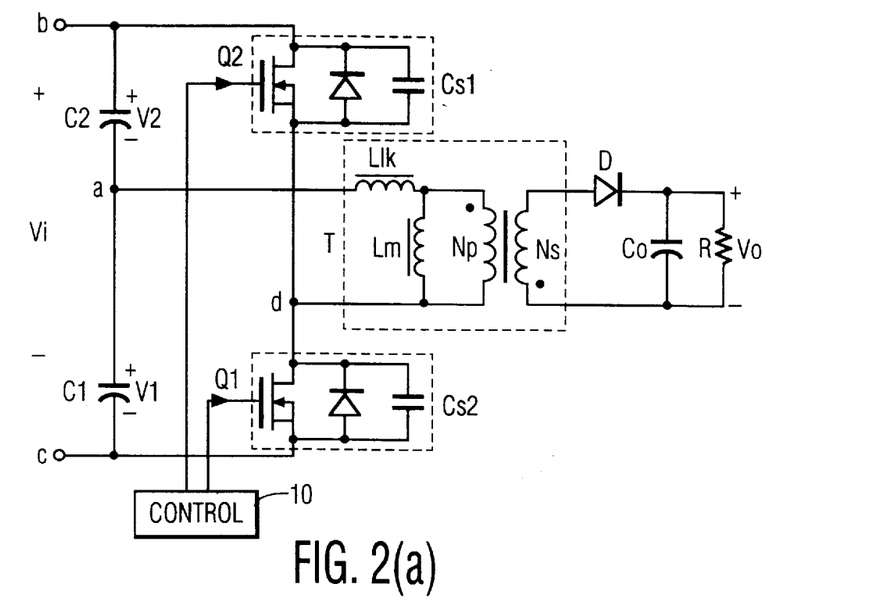
FIG. 2(a) shows a half-bridge zero-voltage-switched (ZVS) pulse-width modulated (PWM) flyback DC/DC converter according to the invention.

FIG. 2(a) shows a first embodiment of the invention having first and second input terminals (b) and (c), respectively, for connection to a source of DC supply voltage, such as the output of a rectifier circuit (not shown) having its input connected to the conventional 50 Hz or 60 Hz AC supply voltage generally available in Europe and the U.S.A. Input terminal (b) is positive (+) with respect to input terminal (c) (−). First and second capacitors C1 and C2 are connected in series circuit across the DC input voltage terminals (b) and (c). First and second semiconductor switches Q1 and Q2, for example, MOSFET devices, are connected in a second series circuit across the DC input terminals.

A junction point (a) between capacitors C1 and C2 is connected to one end of the primary winding Np of an output transformer (T) and the junction point (d) between MOSFET switches Q1 and Q2 is connected to the other end of the transformer primary winding. The transformer leakage inductance Llk is represented by an inductor in the connection between junction point (a) and the one end of the transformer primary winding and the transformer magnetizing inductance Lm is represented by an inductor in parallel with the primary winding. The transformer secondary winding Ns is connected via a rectifier diode D to one end of a smoothing capacitor, Co and to one end of a load, represented by a resistor R. The other end of the transformer secondary winding is connected to the other ends of the smoothing capacitor Co and the load resistor. A DC output voltage, Vo, will be developed across the load resistor with the polarity shown. The polarity of the transformer windings is illustrated by the conventional dot symbols, as shown. A control circuit 10 has output terminals connected to respective control electrodes of the semiconductor switches Q1 and Q2 in order to alternately operate same in the manner to be disclosed below with reference to the waveforms shown in FIG. 5.

Figure 2B:
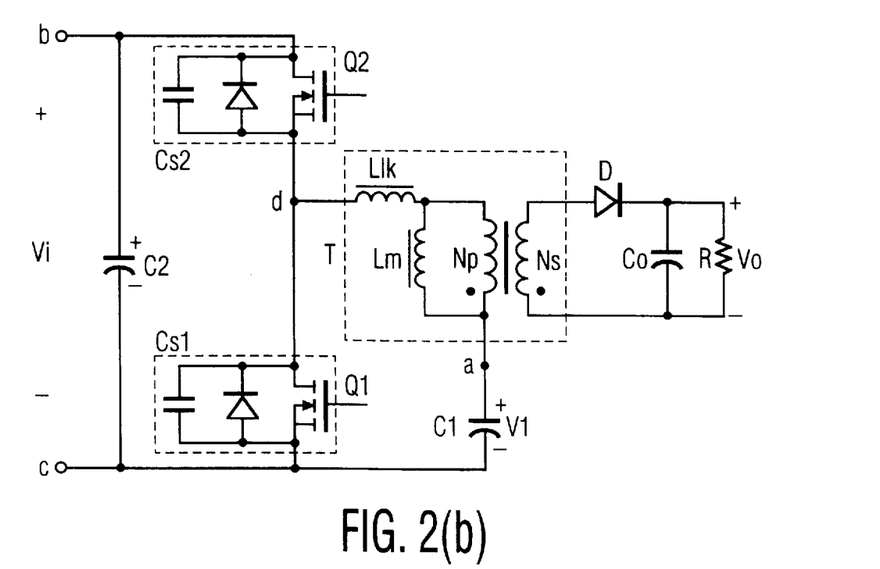
FIG. 2(b) shows a half-bridge ZVS PWM flyback DC/DC converter of the invention with a blocking capacitor.

FIG. 2(b) shows a modified form of the embodiment of the invention shown in FIG. 2(a). The main differences are that the capacitor C2 is connected directly across the DC supply voltage input terminals (b) and (c), and a blocking capacitor C1 is now connected between the second input terminal (c) and the terminal (a) connected to the bottom end of the output transformer primary winding Np. The junction (d) between semiconductor switches Q1 and Q2 is now connected to the top end of the transformer primary winding. The dot symbols on the transformer windings are aligned and again show the polarity of the transformer windings, which is opposite to that shown in FIG. 2(a). It is also possible to reverse the winding polarity in FIG. 2(b) to that of FIG. 2(a) where the dotted secondary is opposed to the dotted primary. The control electrodes of transistors Q1 and Q2 will be connected to the output of a control circuit (not shown) in the manner of FIG. 2(a).

In FIGS. 2(a) and 2(b), the input voltage is applied across terminals (b) and (c) instead of terminals (a) and (c) as in FIGS. 1(a) and 1(b). FIG. 2(a) is the circuit of a half-bridge zero voltage switched pulse width modulated (ZVS-PWM) flyback converter and FIG. 2(b) is the half-bridge converter version with a blocking capacitor. The voltage stress on the MOSFET switches is reduced to the value of the input voltage, which makes the selection of the MOSFET switches cheaper and more flexible. These circuits are particularly suitable for 220 V AC applications.

The operation of the circuit in FIG. 2(a) will be briefly described with reference to the equivalent circuit thereof shown in FIG. 3, wherein the operation of the circuit in FIG. 2(b) is identical.

Figure 3:
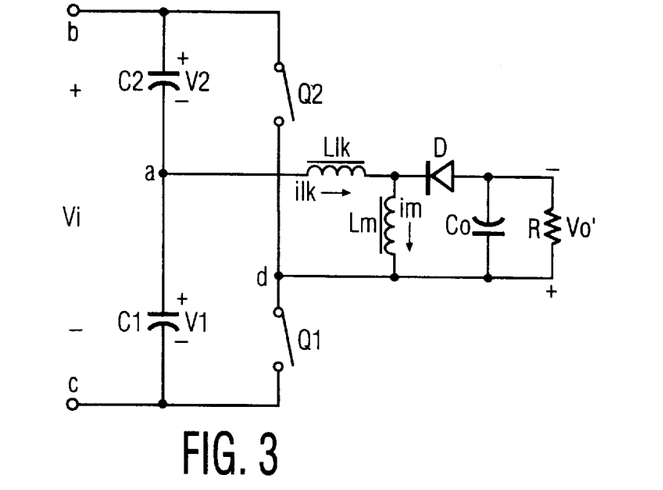
FIG. 3 shows an equivalent circuit of the DC/DC converter in accordance with the invention.

The circuit in the secondary side of the transformer in FIG. 2(a) is reflected to the primary side as shown in FIG. 3, where $R' = (Np/Ns)^2 R$ $Vo' = (Np/Ns)Vo$ $Co' = (Ns/Np)^2 Co$ (5)

In the equivalent circuit of FIG. 3, the MOSFET switches are represented for the sake of simplicity as mechanical on-off switches Q1 and Q2.

Assume that the voltage ripple on capacitors C1, C2 and Co' is very small due to the large capacitance, so that the voltage on these capacitors can be considered as constant. Based on this assumption, the waveforms of the steady-state currents flowing through the two inductors and the steady-state current flowing through the output rectifying diode are shown in FIG. 5. In steady-state operation there are three topological modes as shown in FIGS. 4(a), 4(b) and 4(c).

In FIG. 5, the first (top) waveform shows the control voltage which the control circuit 10 (FIG. 2(a)) applies to the control electrode of MOSFET switch Q1, i.e., $V_{gs1}$ for transistor Q1. The second waveform in FIG. 5 is the control voltage applied to the control electrode of MOSFET switch Q2, i.e., $V_{gs2}$ for transistor Q2. When the waveform is high, the corresponding switch Q1 or Q2 is on, i.e., closed in FIG. 3, and when the waveform is low the switches Q1 and Q2 are off, i.e., open in FIG. 3.

The third waveform of FIG. 5 shows, as a function of time, the transformer magnetizing current im and the leakage inductance current ilk, where Ip is a peak current value. The fourth (bottom) line of FIG. 5 shows the diode current waveform id, also as a function of time.

Figure 4A:
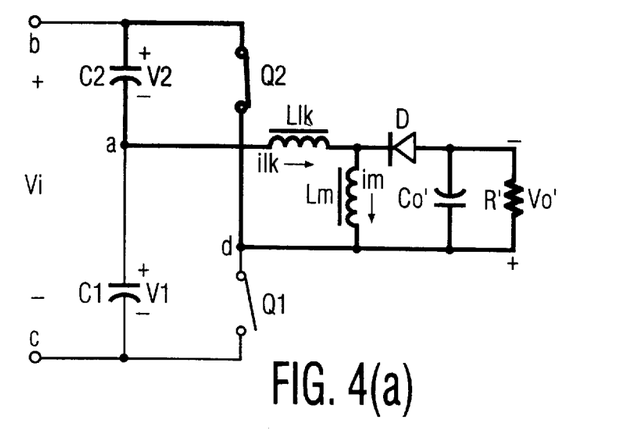
FIGS. 4(a), 4(b) and 4(c) show the three operation stages of the equivalent circuit of FIG. 3.
Figure 4B:
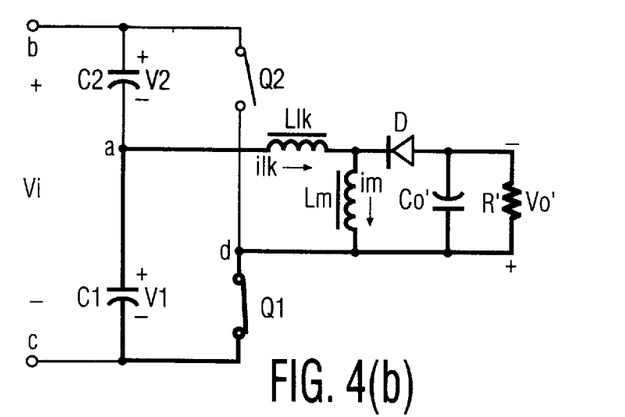
Figure 4C:
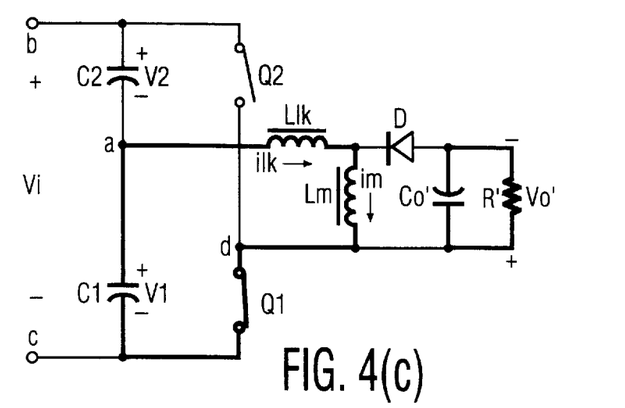
Figure 5:
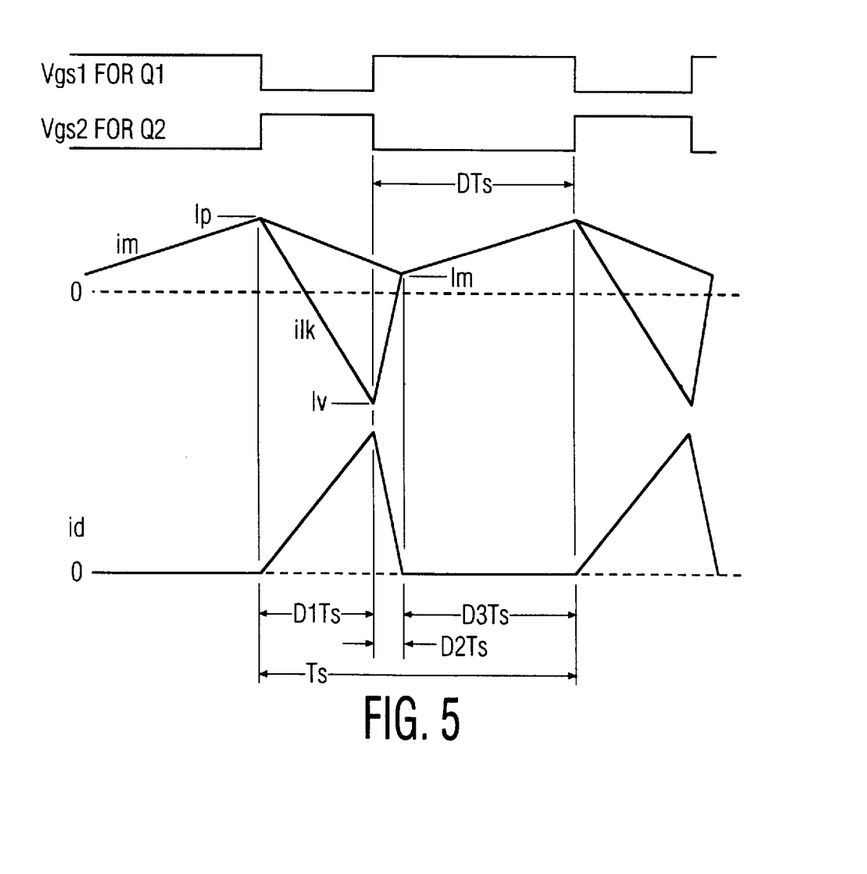
FIG. 5 shows the operation waveforms of the DC/DC converter in accordance with the invention.

In the first operation mode, i.e. as shown in FIG. 4(a), when switch Q1 is turned off and switch Q2 is turned on, the voltage V2 on capacitor C2 is applied to port d-a, leading to the turn on of rectifying diode D. The equivalent circuit is highlighted in FIG. 4(a). The second capacitor C2 is now connected in a closed loop series circuit with the closed second switch Q2 and the transformer primary winding, represented by the leakage inductance Llk and the magnetizing inductance Lm in FIG. 4(a). The inductor currents are obtained from FIG. 4(a) as follows:

$$ilk = Ip - \frac{V2 - Vo'}{Llk} t \quad (6)$$

$$im = Ip - \frac{Vo'}{Lm} t$$

Both currents decrease from a peak value Ip.

At the same time, the current flow id through the diode increases linearly, as shown by the last waveform of FIG. 5.

When switch Q1 is turned on and switch Q2 turned off, i.e., the second operation mode which is shown highlighted in FIG. 4(b), the voltage V1 across capacitor C1 is applied to port a-d. The first capacitor C1 now is connected in a closed loop series circuit with the first switch Q1 and the transformer primary winding (represented by inductors Llk and Lm) in the equivalent circuit of FIG. 4(b).

The inductor currents are obtained as follows:

$$ilk = Ip - \frac{V2 - Vo'}{Llk} D1Ts + \frac{V1 + Vo'}{Llk} t \quad (7)$$

$$im = Ip - \frac{Vo'}{Lm} D1Ts - \frac{Vo'}{Lm} t$$

The magnetizing current im keeps on decreasing as before, while the leakage current ilk now is increasing. The diode current id now linearly decreases, as shown in the bottom waveform of FIG. 5.

When the leakage inductor current reaches the magnetizing current, the rectifying diode D turns off initiating the third operation mode as shown highlighted in FIG. 4(c). The inductor currents now are obtained as follows:

$$ilk = Ip - \frac{V2 - Vo'}{Llk} D1Ts + \frac{V1 + Vo'}{Llk} D2Ts + \frac{V1}{Llk + Lm} t \quad (8)$$

$$im = Ip - \frac{Vo'}{Lm} D1Ts - \frac{Vo'}{Lm} D2Ts + \frac{V1}{Llk + Lm} t$$

The leakage and magnetizing inductance currents now increase in unison.

The current id flowing through the rectifying diode is equal to the difference between the leakage current and the magnetizing current.

$$id = im - ilk \quad (9)$$

Therefore, the diode current is a triangular waveform with a linear rise and a linear fall, leading to reduced EMI noise generation. When switch Q1 is closed (turned on) again and switch Q2 is opened, a new three stage operation cycle commences.

The voltage conversion ratio of the input to the output is analytically obtained as follows:

$$M = \frac{Vo'}{Vi} = \quad (10)$$

$$\frac{1-D}{2\alpha(1+\alpha)\beta} \{\sqrt{[(1-D)(1+\alpha) + \alpha\beta]^2 + 4\alpha(1+\alpha)\beta D} - [(1-D)(1+\alpha) + \alpha\beta]\}$$

-continued where, $$\alpha = \frac{Llk}{Lm} \quad (11)$$

$$\beta = \frac{2fsLm}{R'}$$

Figure 7:
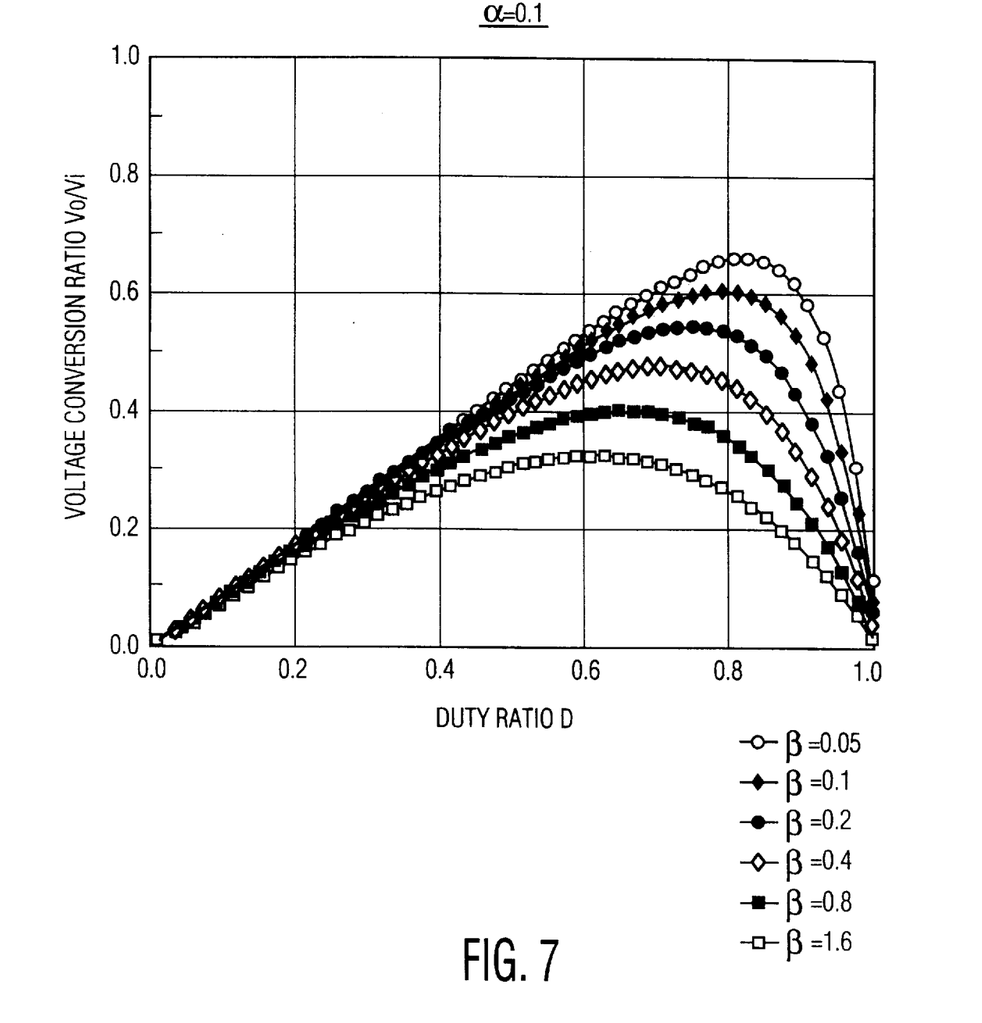
FIG. 7 is a graph of the calculated results of the voltage conversion ratio.

FIG. 7 shows the calculated results of the voltage conversion ratio for the case where α=0.01. In FIG. 7, the horizontal axis is the duty ratio D and the vertical axis is the voltage conversion ratio Vo'/Vi. It can be seen from FIG. 7 that the output voltage is always lower than the input voltage, which is different from the operation of a conventional flyback converter. FIG. 7 also illustrates the non-linear relationship of the voltage conversion ratio (Vo'/Vin) and the duty ratio (D).

Figure 6:
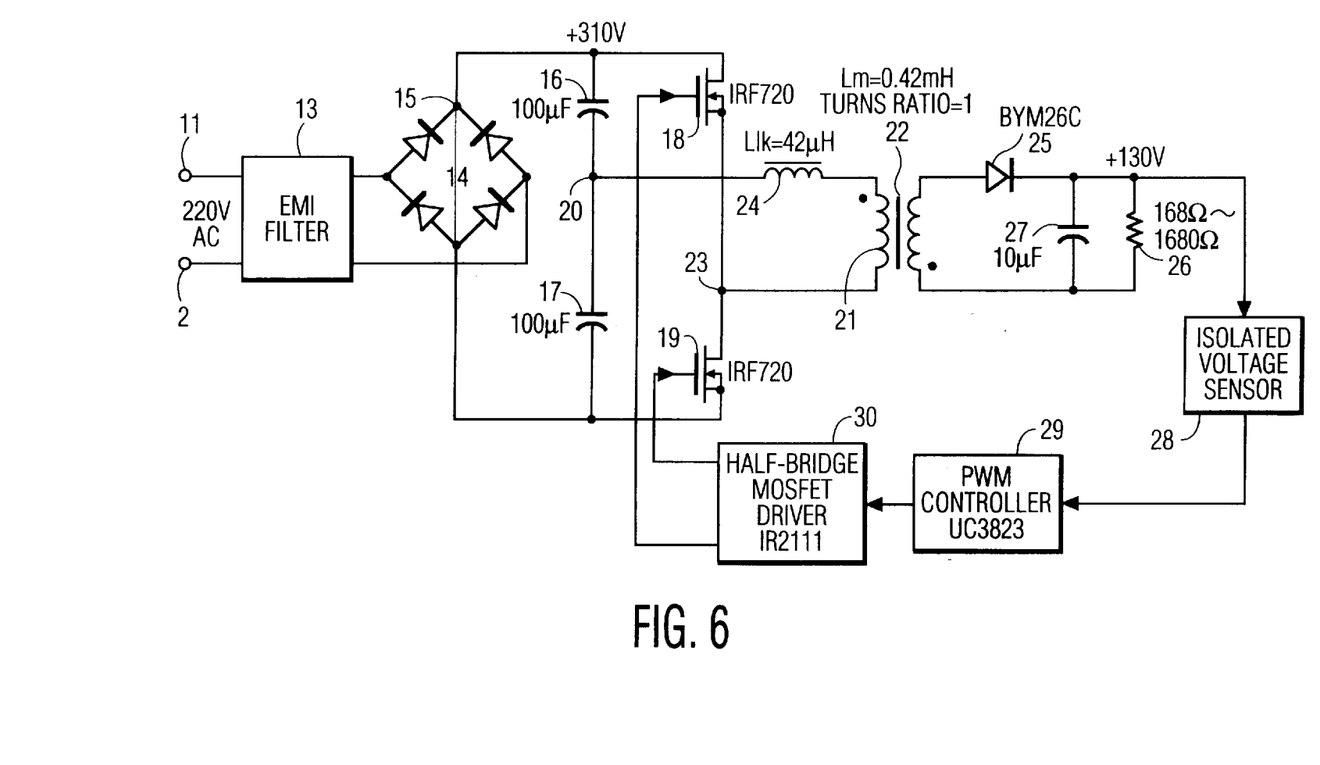
FIG. 6 is a circuit for a 100 W, 130 V power supply operable at 100 KHz.

FIG. 6 shows an embodiment of the invention which has special utility in a European TV receiver. This converter circuit is a 100 W, 130 V power supply operable at 100 KHz. Input terminals 11, 12 will be connected to the 220 V AC supply lines. An EMI filter 13 is connected between the input terminals and a bridge rectifier 14. The output terminals of the bridge rectifier supply a DC voltage of 310 V with terminal 15 supplying the positive voltage.

First and second capacitors 16 and 17 are connected in a first series circuit across the DC output terminals of bridge rectifier 14. For example, these capacitors may be 100 μF each. A second series circuit of MOSFET switching devices 18 and 19 is connected in parallel with the first circuit 16, 17. The switching transistors 18 and 19 may, for example, each be an IRF 720 device.

A junction point 20 between capacitors 16 and 17 is connected to the top end of primary winding 21 of a transformer 22 and a junction point 23 between transistors 18 and 19 is connected to the bottom end of the transformer. The transformer leakage inductance 24 is connected between junction point 20 and the top end of primary winding 21. The leakage inductance can be a separate external inductor or a combination of the transformer leakage inductance plus a series connected external inductor. In one example, the leakage inductance was 42 μH. The magnetizing inductance Lm of the transformer (not shown) is, in the given example, 0.42 mH. It has been found that best results are obtained when the leakage inductance is 10% or more of the magnetizing inductance (Lm). This then provides for zero voltage switching and for a smooth rectifier current.

The transformer secondary winding is coupled at one end via a diode 25 to one end of a capacitor 27 and a load 26. The other end of the secondary winding is coupled to the other ends of capacitor 27 and load 26. In the given example, the transformer turns ratio is 1:1, the diode is a BYM 26C device, capacitor 27 is 10 μF and the load can be represented by a resistor of 168–1680 ohms. A DC voltage of +130 V is obtained at the load.

The +130 V terminal of the load is connected to an input of an isolated voltage sensor 28. The output of the voltage sensor is coupled to an input of a PWM controller 29, for example, of the type UC3823. The output of the PWM controller is in turn coupled to an input of a half-bridge MOSFET driver 30, for example, of the type IR2111. The driver 30 in turn has first and second outputs connected to the control electrodes of semiconductor switches 18 and 19, respectively. The controller and driver supply the drive waveforms that produce the novel three stage operation modes described above.

Figure 8A:
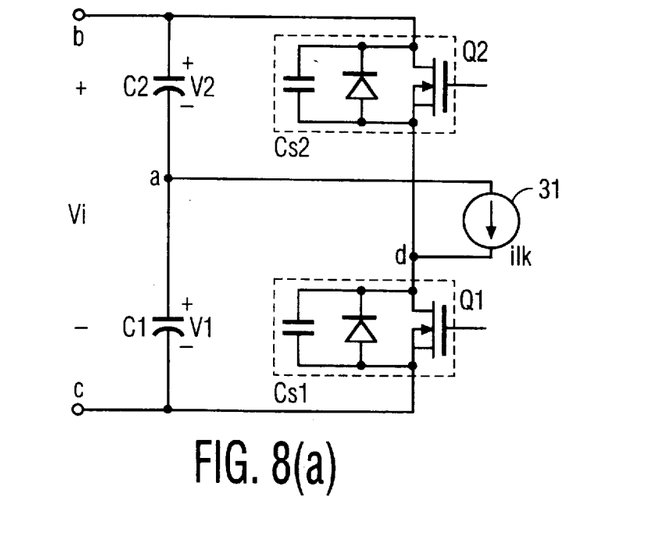
FIG. 8(a) is an equivalent circuit of a converter which illustrates the zero voltage switching principle in accordance with the invention.
Figure 8B:
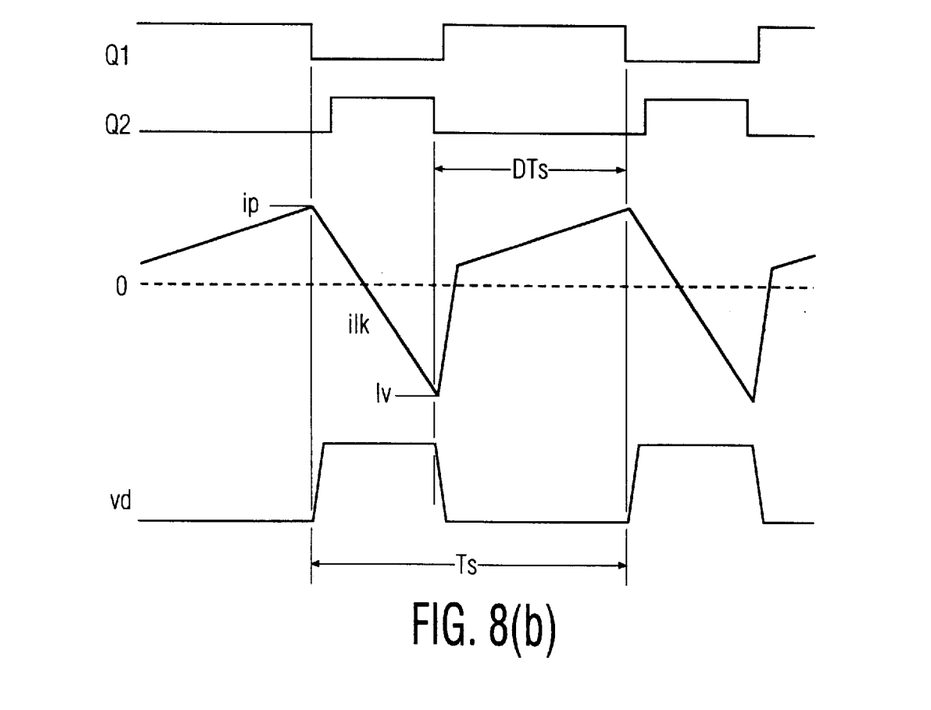
FIG. 8(b) shows waveforms that help to explain the operation of the equivalent circuit of FIG. 8(a)

The zero-voltage switching is achieved by controlling the two gate signals of the MOSFETs such that there is a small dead-time between the two gate signals during which both MOSFETs are turned off. FIG. 8(a) shows an equivalent circuit of the invention while FIG. 8(b) shows waveforms similar to FIG. 5 describing the operation sequence of zero voltage switching, where in FIG. 8(a) a current source 31 is used to represent the current flowing through the leakage inductor. In FIG. 8(b), the third waveform represents the leakage inductor current Ilk versus time and the fourth waveform represents the voltage vd at the junction point (d) of the converter.

When MOSFET Q1 is turned off, leakage current ilk (=Ip) charges capacitor Cs1 and discharges capacitor Cs2. The voltage vd at point (d) in FIG. 8(a) gradually rises to Vi. When the voltage vd reaches the voltage Vi, the body diode of transistor switch Q2 turns on. If the turn-on signal is applied to switch Q2 after its body-diode turns on, switch Q2 will be turned on at zero voltage. Next, when transistor Q2 is turned-off, the leakage inductor current ilk (=Iv) charges capacitor Cs2 and discharges capacitor Cs1. The voltage vd at point (d) falls to zero gradually. When it reaches zero, the body-diode of transistor Q1 turns on. If the turn-on signal is applied to transistor Q1 after its body-diode turns on, transistor Q1 will be turned on at zero voltage. The smooth transition of the switching voltage results in low EMI noise generation and a reduction of the switching losses.

Figure 9:
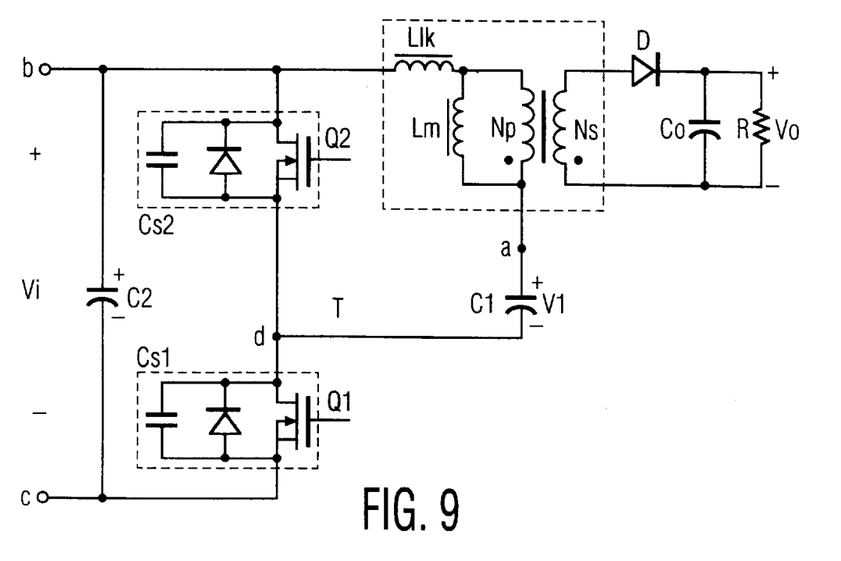
FIG. 9 shows a circuit modification in which the connections of the blocking capacitor have been changed.

FIG. 9 shows another embodiment of the invention in which the blocking capacitor is now connected between the bottom terminal (a) of the transformer primary winding and the junction point (d) between the MOSFET switches Q1 and Q2. In accordance with equation (10) above, D represents the on duty ratio of MOSFET switch Q2. If the transformer winding polarity is reversed to that of FIG. 2(a), i.e., the dot for primary winding Np is now at the top end of the primary winding, then equation (10) holds true for the circuit of FIG. 9.

Figure 10:
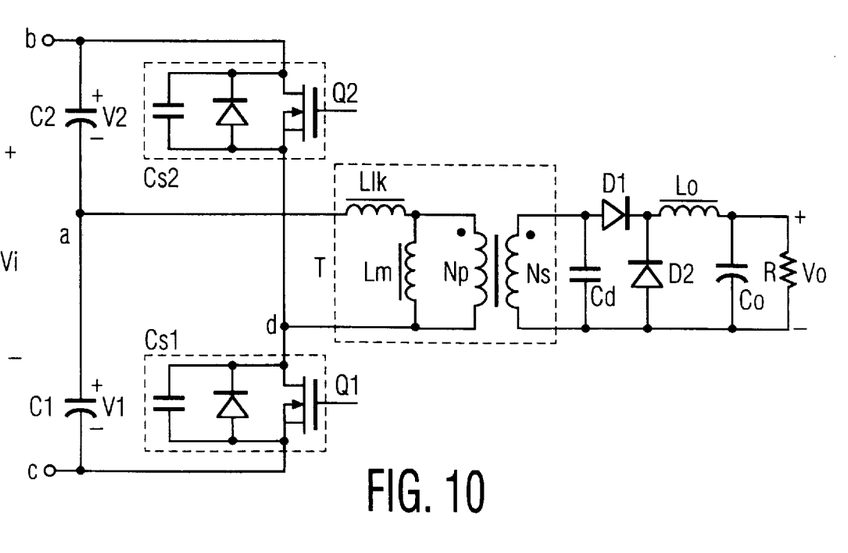
FIG. 10 shows a half-bridge zero-voltage switched PWM forward DC/DC converter of the invention.

FIG. 10 shows a half-bridge forward converter in accordance with the invention. This circuit is similar to that in FIG. 2(a) except that the transformer winding polarity is reversed, an inductor Lo is connected in series with the diode, now labelled D1, a capacitor Cd is connected across the transformer secondary winding and a diode D2 is connected with opposite polarity between the cathode of diode D1 and the bottom end of the secondary winding. The half-bridge ZVS PWM forward DC/DC converter of FIG. 10 operates on the same concepts as those described above for FIGS. 2(a) and 2(b).

Another possible variation of the invention is to provide a multi-output converter which employs plural secondary windings magnetically coupled to the primary winding and each secondary winding having a separate output circuit similar to the output circuit of FIG. 2(a), including a diode D and a capacitor Co, and with each output circuit connected to a separate load resistance.

It will be apparent from the above description of the various embodiments of the DC/DC converter that the invention provides significant advantages over prior art converters. As compared to the conventional flyback converters, the invention provides reduced voltage stress on the semiconductor switches, reduced EMI noise and switching losses, a low di/dt is obtained for the rectifying diode, and zero-voltage-switching can be provided.

Advantages over the resonant flyback type of converter includes reduced voltage and current stress on the semiconductor switch, a low value of di/dt for the rectifying diode, and constant frequency pulse width modulation is possible in order to provide output regulation. Advantages over the clamp mode flyback converter include reduced voltage stress on the semiconductor switches and reduced voltage stress on the clamp capacitor.

Various modifications of the disclosed embodiments of the invention are possible within the scope of the invention described herein. For example, the leakage inductance and/or the magnetizing inductance can be external inductors. The inherent semiconductor switch capacitances Cs1 and Cs2 can be external capacitors. Other types of semiconductor switching types can be used instead of the disclosed MOSFET switches Q1 and Q2, such, as bipolar junction transistors, isolated-gate bipolar junction transistors and so on. The transformer polarity can be reversed. The blocking capacitor C1 in FIG. 2(b) can be connected differently. The inventive concept is also applicable to a forward converter.

While the invention has been described in connection with certain preferred embodiments thereof, it will be understood that various modifications thereof are possible within the principles outlined above and will be evident to those skilled in the art, and thus the invention is not limited to the preferred embodiments but is intended to encompass such modifications.

We claim:

1. A DC-DC converter circuit comprising:
   a) a transformer having a primary, a secondary, and a magnetizing inductance connected in parallel with the primary,
   b) an auxiliary inductance connected in series with the transformer primary,
   c) an input having first and second terminals for connection to a dc input voltage source,
   d) a first switch connecting the input second terminal to the transformer primary,
   e) a second switch connecting the input first terminal to the transformer primary,
   f) a first capacitor connected in series with the first switch and the transformer primary,
   g) a second capacitor connected in series with the second switch and the transformer primary,
   h) a rectifier connected to the transformer secondary,
   i) an output connected to the rectifier and the transformer secondary, and
   j) a controller for controlling operation of the switches such that:
      i) during a first operation period, the first switch is open and the second switch is closed causing currents through both the magnetizing inductance and auxiliary inductance to decrease, turning on the rectifier,
      ii) during a second operation period, the first switch is closed and the second switch is open causing the current through the magnetizing inductance to continue to decrease while causing the current through the auxiliary inductance to increase, maintaining the rectifier on, and
      iii) during a third operation period, while the first switch is closed and the second switch is open, the current through the auxiliary inductance reaches the level of current flowing through the magnetizing inductance whereupon, the current through both the auxiliary inductance and magnetizing inductance increase, turning off the rectifier.

2. A DC-DC converter circuit as claimed in claim 1, wherein the auxiliary inductance is an external inductor.

3. A DC-DC converter circuit as claimed in claim 1, wherein the auxiliary inductance is the intrinsic leakage inductance of the transformer.

4. A DC-DC converter circuit as claimed in claim 1, wherein the magnetizing inductance is an external inductor.

5. A DC-DC converter circuit as claimed in claim 1, wherein the magnetizing inductance is the intrinsic magnetizing inductance of the transformer.

6. A DC-DC converter circuit as claimed in claim 1, wherein each of the switches comprises a semiconductor switch.

7. A DC-DC converter circuit as claimed in claim 6, wherein each of the semiconductor switches is a MOSFET having a body diode, and an external capacitor is connected across each of the MOSFETs.

8. A DC-DC converter circuit as claimed in claim 7, wherein each of the semiconductor switches is a MOSFET having a body diode and an intrinsic junction capacitance in parallel with each of the MOSFETs.

9. A DC-DC converter circuit as claimed in claim 1, wherein the transformer has a dotted and an undotted side of the primary and a dotted secondary opposed to the dotted primary, the second capacitor and the second switch are connected to the positive terminal of the input, the first capacitor and the first switch are connected to the negative terminal of the input, both the first and second switches are connected via a common node to the undotted side of the primary, and the first and second capacitors are connected via a common node to the dotted side of the primary.

10. A DC-DC converter circuit as claimed in claim 1, wherein the transformer has a dotted and an undotted side of the primary and a dotted secondary aligned with the dotted primary, the second capacitor and the second switch are connected to the positive terminal of the input, the first capacitor and the first switch are connected to the negative terminal of the input, both the first and second switches are connected via a common node to the undotted side of the primary, the first capacitor is connected to the dotted side of the primary, and the second capacitor is connected across the input.

11. A DC-DC converter circuit as claimed in claim 1, wherein the transformer has a dotted and an undotted side of the primary and a dotted secondary aligned with the dotted primary, the second capacitor and the second switch are connected to the positive terminal of the input, the first capacitor and the first switch are connected to the negative terminal of the input, both the first and second switches are connected via a common node to the dotted side of the primary, and the first and second capacitors are connected via a common node to the undotted side of the primary.

12. A DC-DC converter circuit as claimed in claim 1, wherein the transformer has a dotted and an undotted side of the primary and a dotted secondary opposed to the dotted primary, the second capacitor and the second switch are connected to the positive terminal of the input, the first capacitor and the first switch are connected to the negative terminal of the input, both the first and second switches are connected via a common node to the dotted side of the primary, the first capacitor is connected to the undotted side of the primary, and the second capacitor is connected across the input.

13. A DC-DC converter circuit as claimed in claim 1, wherein the transformer has a dotted and an undotted side of the primary and a dotted secondary aligned with the dotted primary, the second switch is connected to the positive terminal of the input, the second capacitor is connected between the dotted side of the primary and a common node of both switches, the first capacitor and the first switch are connected to the negative terminal of the input, and the first capacitor is connected across the input.

14. A DC-DC converter circuit as claimed in claim 1, wherein the transformer has a dotted and an undotted side of the primary and a dotted secondary opposed to the dotted primary, the second switch is connected to the positive terminal of the input, the first capacitor and the first switch are connected to the negative terminal of the input, the second capacitor is connected via a common node of both switches to the undotted side of the primary, and the first capacitor is connected across the input.

15. A DC-DC converter circuit as claimed in claim 1, wherein the controller further controls the operation of the switches such that at the initial part of the first operation period, both the first and second switches are open for a short dead-time to achieve zero-voltage switching, and at the initial part of the second operation period, both the first and second switches are open for a short dead-time to achieve zero-voltage switching.

16. In a method of operating a DC-DC converter circuit having:
  a) a transformer having a primary, a secondary, and a magnetizing inductance connected in parallel with the primary,
  b) an auxiliary inductance connected in series with the transformer primary,
  c) an input having first and second terminals for connection to a dc input voltage source,
  d) a first switch connecting the input second terminal to the transformer primary,
  e) a second switch connecting the input first terminal to the transformer primary,
  f) a first capacitor connected in series with the first switch and the transformer primary,
  g) a second capacitor connected in series with the second switch and the transformer primary,
  h) a rectifier connected to the transformer secondary,
  i) an output connected to the rectifier and the transformer secondary,
  j) a controller for controlling operation of the switches,
  said method comprising the steps:
    i) during a first operation period, opening the first switch and closing the second switch causing currents through both the magnetizing inductance and auxiliary inductance to decrease, turning on the rectifier,
    ii) during a second operation period, closing the first switch and opening the second switch causing the current through the magnetizing inductance to continue to decrease while causing the current through the auxiliary inductance to increase, maintaining the rectifier on,
    iii) during a third operation period, maintaining the first switch closed and second switch open such that the current through the auxiliary inductance reaches the level of current flowing through the magnetizing inductance whereupon the current through both the auxiliary inductance and magnetizing inductance increase, turning off the rectifier, and
    iv) at the initial part of the first and second operation periods, opening both the first and second switches for a short dead-time to achieve zero-voltage switching.

17. A DC-DC converter circuit comprising:
  a) a transformer having a primary, a secondary, and a magnetizing inductance connected in parallel with the primary, b) an auxiliary inductance connected in series with the transformer primary, c) an input having first and second terminals for connection to a dc input voltage source, d) a first switch connecting the input second terminal to the transformer primary, e) a second switch connecting the input first terminal to the transformer primary, f) a first capacitor connected in series with the first switch and the transformer primary, g) a second capacitor connected in series with the second switch and the transformer primary, h) a rectifier connected to the transformer secondary, i) an output connected to the rectifier and the transformer secondary, j) a controller for controlling operation of the switches such that:
  i) during an initial part of a first operation period, both the first and second switches are open for a short dead-time to achieve zero-voltage switching,
  ii) during the remainder of the first operation period, the first switch is open and the second switch is closed turning on the rectifier and causing a current through the rectifier to rise linearly,
  iii) during an initial part of the second operation period, both the first and second switches are open for a short dead-time to achieve zero-voltage switching,
  iv) during the remainder of the second operation period, the first switch is closed and the second switch is open causing the current through the rectifier to fall linearly,
  v) during a third operation period, while the first switch is closed and the second switch is open, the rectifier is turned off, whereby the linear rise and fall of rectifier current reduces EMI noise generation and any voltage stress of the switches; is reduced.

18. A DC-DC converter circuit as claimed in claim 17, wherein the inductance of the auxiliary inductance is at least 10% that of the magnetizing inductance.

19. A DC-DC converter circuit claimed in claim 17, wherein;
the first and second capacitors are connected in a first series circuit across the first and second input terminals, the first and second switches are connected in a second series circuit across the first and second input terminals, a junction point between the first and second capacitors is connected via the auxiliary inductance to one end of the transformer primary, and a junction between the first and second switches is connected to a second end of the transformer primary.

20. A DC-DC converter circuit as claimed in claim 17, wherein;
the second capacitor is connected across the first and second input terminals, a junction point between the first and second switches is connected via the auxiliary inductance to a first end of the transformer primary, and the first capacitor is connected between the second input terminal and a second end of the transformer primary.

21. A DC-DC converter circuit comprising:

a transformer having a primary, a secondary, and a magnetizing inductance connected in parallel with the primary, an auxiliary inductance connected in series with the transformer primary, first and second input terminals for connection to a DC source of supply voltage, first and second switches connected in series circuit across the input terminals, means connecting the auxiliary inductance between the first input terminal and a first end of the transformer primary winding, means connecting the first switch to the second input terminal, means connecting a first capacitor between a junction point between the first and second switches and a second end of the transformer primary winding, means connecting a second capacitor across the input terminals, and a diode-capacitor output circuit coupling the transformer secondary winding to output terminals of the converter circuit.

* * * * *